June 7, 1966    G. V. KULLGREN ETAL    3,254,368
PLASTIC FABRICATING MACHINES
Original Filed June 16, 1961    2 Sheets-Sheet 1
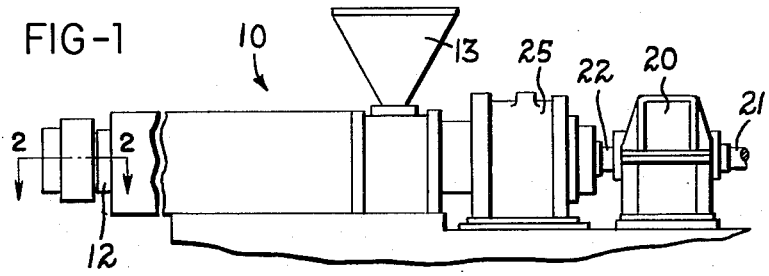
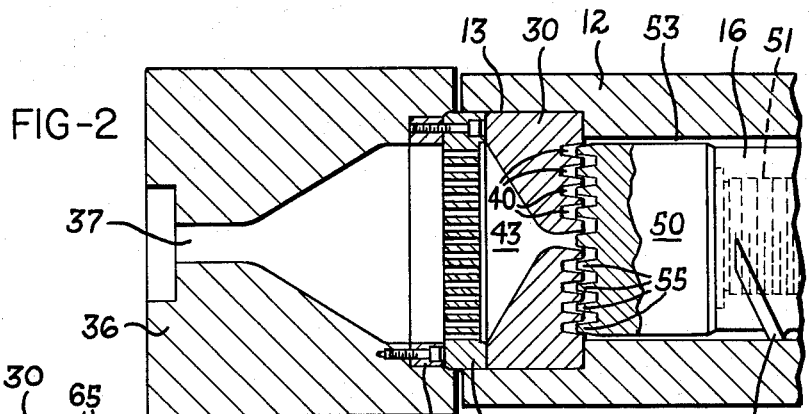
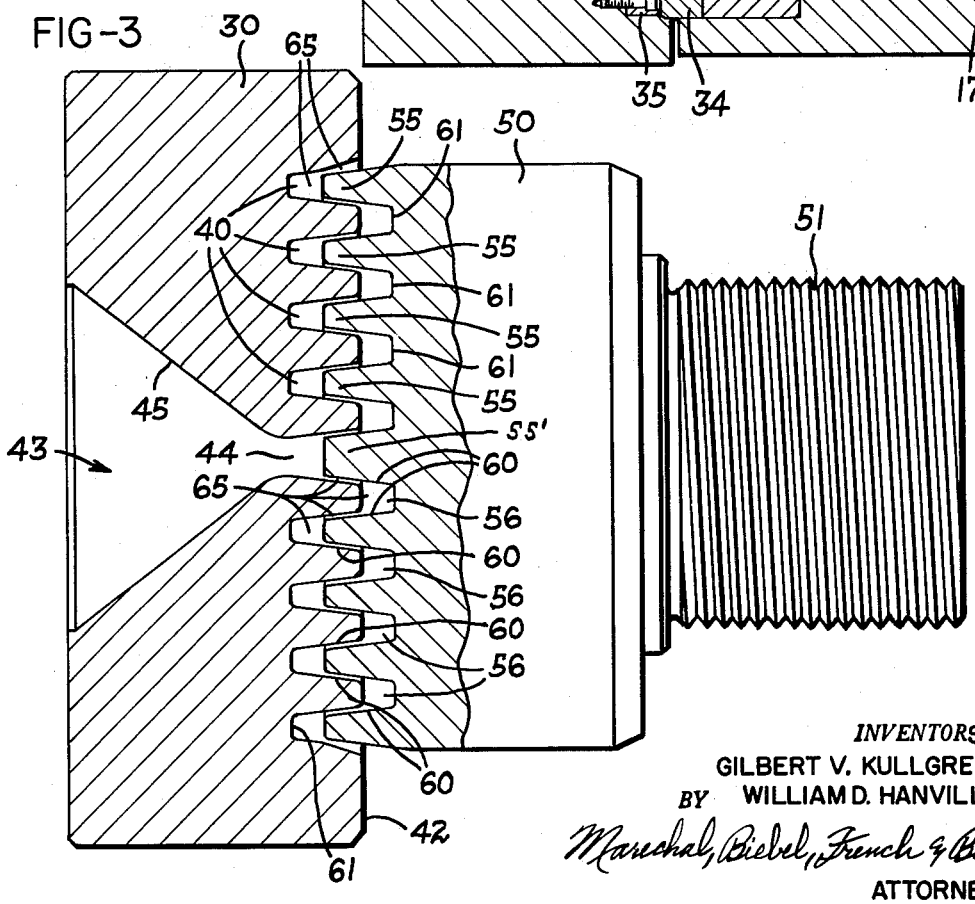
INVENTORS
GILBERT V. KULLGREN &
BY  WILLIAM D. HANVILL
Marechal, Biebel, French & Bugg
ATTORNEYS

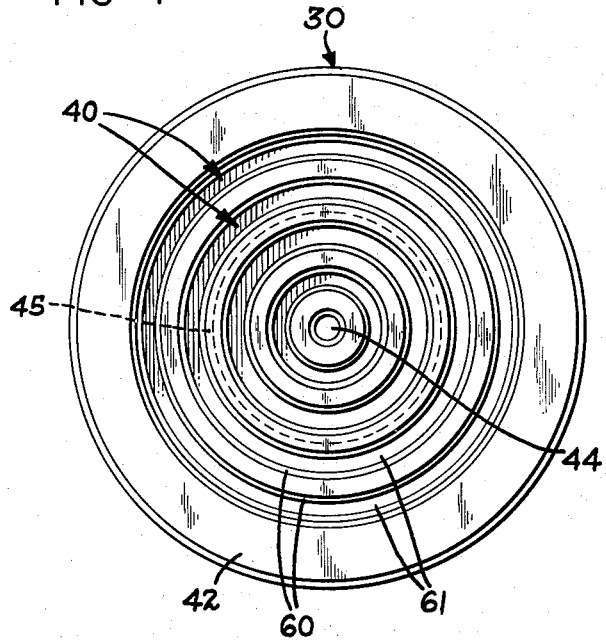

United States Patent Office 3,254,368
Patented June 7, 1966

3,254,368
PLASTIC FABRICATING MACHINES
Gilbert V. Kullgren and William D. Hanvill, Akron, Ohio, assignors to The Black-Clawson Company, Hamilton, Ohio, a corporation of Ohio
Continuation of application Ser. No. 115,160, June 6, 1961. This application Feb. 24, 1965, Ser. No. 439,510
6 Claims. (Cl. 18—12)

This application is a continuation of application Serial No. 115,160 filed June 6, 1961, now abandoned.

This invention relates to plastic fabricating machines, and more particularly to a plastic extruding machine for the working and conversion of pelletized or granular plastic material into an extrudible plastic with a minimum of non-extrudible particles remaining therein.

The apparatus of this invention provides an extruding machine having an extruding valve arrangement which provides accurate control for the build-up of back pressure of the material within the extruder barrel. Such control provides internal heat within the plastic material by means of the work put into the material by the screw of the extruder, thus reducing the amount of heat which must be externally applied to effect the desired plasticizing. A further advantage of the invention resides in the capability of subjecting the plastic material to a high shearing action between adjacent relatively moving surfaces to provide uniformity in the melt and elimination of hard spots.

It is therefore a principal object of this invention to provide a plastic extruding machine incorporating an extruding valve which provides for the working and upgrading of plastic material into a suitable plastic for extrusion through a die with a minimum of hard spots remaining and which provides for high capacity operation of the extruder.

A further important object of this invention is the provision of a plastic extruding machine incorporating an extruding valve for the accurate control of the extruding pressure.

Another object of this invention is the provision of a plastic extruding machine having an extruding valve therein which provides for a multiple shearing action of the plastic material as it leaves the extruder barrel.

A further object of this invention is the provision of a plastic extruding machine incorporating an extruding valve including interfitting and relatively moving ring portions for the shearing and upgrading of the plastic material moving therebetween.

A still further object of this invention is the provision of a valve assembly for incorporation into a plastic extruder and having ring portions on the adjacent face thereof for interfitting relative rotational movement.

Other objects and advantages of the invention will be apparent from the following description, the accompanying drawings and the appended claims.

In the drawings—
FIG. 1 is an elevational view of a plastic machine according to this invention;
FIG. 2 is an enlarged fragmentary section through the discharge end of the barrel with the heater removed taken generally along line 2—2 of FIG. 1;
FIG. 3 is an enlarged sectional detail of the valve members of FIG. 2; and
FIG. 4 is an end elevational view of the stationary valve member shown in axial section in FIG. 3.

Referring to the drawings, which illustrate a preferred embodiment of the invention, a plastic extruding machine is illustrated at 10 in FIG. 1 as including an extruding barrel 12 which has an inlet at the inner end thereof and an extended extrusion outlet formed on the opposite end, as well known in the art. The inner inlet end of the barrel opens into a hopper 13 within which granular or pelletized plastic material may be placed for heating and conversion by this machine into a form suitable for extrusion through a plastic die. A screw 16 (FIG. 2) is rotatably received within the barrel 12 and is formed with flighting 17 to move the plastic material lengthwise of the barrel from the hopper to the discharge end.

Means for rotating the screw 16 at desired rates includes a reduction gear box 20 having an input shaft 21 which may be connected to any suitable prime mover, such as an electric motor (not shown). The output shaft 22 of the gear reduction unit 20 is connected to the input shaft of a thrust unit 25. The unit 25 supports the inner end of the screw 16 in a predetermined axial position in the barrel and includes provision for the incremental axial adjustment of the screw 16 within the barrel 12. The thrust unit is preferably constructed according to the teachings of the U.S. Patent to Kullgren et al. No. 2,944,296, entitled "Extrusion Screw Adjusting Mechanism," issued July 12, 1960.

Any suitable extrusion die (not shown) may be connected to receive plastic from the extended end of the barrel 12. It is also understood that suitable means may be incorporated within the machine 10 for the purpose of heating the barrel 12, and one such means which is satisfactory and which is preferred is that of induction heating, as fully disclosed and claimed in the copending application of Kullgren et al., Serial No. 110,502, filed May 16, 1961, now Patent No. 3,129,459, issued April 21, 1964, and assigned to the same assignee as this application.

The extruder 10 includes valve means positioned adjacent the discharge end of the barrel 12 for maintaining the back-up pressure within the barrel and for effecting multiple shearing of the plastic material as it leaves the barrel. This valve means is shown in FIG. 2 and in enlarged detail in FIG. 3 as including a first valve member 30 which is received within a suitable opening 31 formed within the end of the barrel 12. The valve member 30 preferably forms a close sealing fit within the opening 31, and may be held fixedly in place against extrusion pressures by a breaker plate assembly 34 which is connected to a ring spacer 35 in an outlet block 36. The outlet block 36 is formed with a suitable axial cavity 37 and provides the connection to a suitable extrusion die, as desired. The block 36 may be held in place against the breaker plate assembly 34 by any suitable clamping arrangement, and one such suitable arrangement is described in the above-mentioned patent to Kullgren et al. A wire filter screen is preferably positioned to the right of the breaker plate assembly 34 in the cavity provided therefor, but is removed in the illustration of FIG. 2 for the sake of simplicity.

The first valve member 30 is formed with a planar inner face upon which a plurality of ring portions are formed. The ring portions preferably comprise concentric uniformly spaced depressions 40 suitably formed, as by cutting, into the planar inner face 42 of the member 30. The member 30 also includes an axial outlet opening 43 formed centrally thereof which includes a constricting throat portion 44 and which flares outwardly at 45 immediately in front of the breaker plate assembly 34.

The valve means further includes a mating or second valve member 50 which is carried on the outer end of the screw 16 within the barrel 12 for rotation therewith. The member 50 is fixed on the screw 16 by means of a threaded stud connection 51 so that the member 50 actually forms an end extension of the shaft 16. Preferably, the diameter of the member 50 is slightly greater than the root diameter of the shaft 16 so as to provide a somewhat constricted annular space 53 between the outer periphery thereof and the inner surface of the barrel through which the molten plastic material may flow toward the outlet 43.

The member 50 is preferably provided with a plurality of concentric uniformly spaced ring portions which are formed as raised portions 55 suitably formed by cutting grooves 56 within the outer planar face thereof. The raised portions 55 are proportioned for interfitting relative movement within the depressions 40 of the member 30 and are preferably formed with a profile which is patterned after these depressions. The grooves 56 of the member 50 also define a central portion 55' which is proportioned to extend and rotate within the throat 44.

Referring more specifically to the enlarged showing of FIG. 3, it can be seen that the respective raised portions 55 and depressions 40 are each formed with relatively straight sides 60 which are terminated at relatively flat roots 61. Thus, in the interfitting relation, as shown, the members 30 and 50 define therebetween a tortuous valve exit space 65 therebetween. The space 65 connects the annular space 53 with the outlet 43 wherein the material is subjected to simultaneous expression, shearing, and pressure build-up as it flows from within the barrel 12 to the outlet opening 43.

The space 65 is not necessarily of uniform axial dimension throughout. As shown best in FIG. 3, space 65 is of narrower dimension between the sides of the depressions 40 and the raised portions 55 than at the roots thereof. This has the effect of alternately increasing and then somewhat decreasing the velocity of the material moving inwardly through the space 65. However, since the interfitting ring portions of the members are of substantially similar dimensions, the effective volume defined by the exit space 65 decreases as the material moves radially inwardly so that its velocity increases and reaches its highest point at the throat 44 of the outlet 43. It will also be seen that the relative rotational velocity of the parts will vary directly with the radius and will be the highest adjacent the inlet to the space 65 and will be the lowest adjacent the outlet 43.

The spaced apart distance of the valve members 30 and 50 may be accurately controlled by manipulation of the controls associated with the unit 25 so as to create the desired back pressure within the barrel according to the type of material being extruded. The spacing between the raised portion 55' in the throat 44 is the main control of pressure build-up since the volume of the valve is the least at this point. The shearing action to which the material is subjected therein results in the upgrading of the material by the elimination of hard spots, lumps, and other undesirable qualities. The invention provides an ability to run an extruder at relatively high extrusion rates and high pressures in the order of 10,000 lbs. or more per square inch with a clearance between the straight sides 60 of the depressions and the raised portions between 20 and 80 thousandths of an inch, depending upon the viscosity or the stiffness of the plastic being extruded. The high pressure and shearing puts work in the form of heat into the plastic material and decreases the amount of heat which must be applied by an external source.

As a specific example, in no way intended to limit the invention, the member 30 may be provided with four concentric depressions 40 about the outlet opening 43. The depth of the depressions 40, and the height of the mating raised portions 55, are preferably equal, and this dimension is preferably substantial as compared to the radial spaced apart dimension between adjacent rings. Thus, the depth may be 0.75 inch while the spaced apart distance between adjacent rings may be 0.676 inch. The opening 43 at its narrowest point 44 may be ¼ inch in diameter for a 4½ inch extruder and the side walls of the depressions or the raised portions may form a 7° angle with the axis of the barrel.

It is therefore seen that this invention provides an extruder and a valve assembly for incorporation into an extruder, which effects multiple shearing of the material to be extruded resulting in the upgrading thereof into a quality suitable for extrusion with the reduction of anomalous particles within the plastic, and providing for a high extrusion rate.

While the form of apparatus herein described constitutes a preferred embodiment of the invention, it is to be understood that this invention is not limited to this precise form of apparatus, and that changes may be made therein without departing from the scope of the invention which is defined in the appended claims.

We claim:

1. An extruder for working and extruding plastic material and including a device for controlling back-up pressure and developing a mixing action, comprising a barrel having an inlet and an outlet, an extrusion screw rotatably mounted in said barrel for the movement of plastic material from said inlet through said barrel to said outlet, a first mixing member rigidly connected to said barrel adjacent said outlet and having on the inner face thereof a plurality of concentric annular depressions, means in said first member defining an axial outlet opening for restricting the discharge flow of material from said extruder, a second mixing member spaced within said barrel on the discharge end of said screw and defining said barrel an annular space between the outer surface of said second member and said barrel through which such material flows from said screw to said first member, means mounting said second member for rotation with said screw, said second member having a plurality of concentric annular raised portions corresponding generally to the configuration of said depressions and projecting axially into said depressions in spaced apart interfitting relationship effecting during rotation of said second member a controlled back-up pressure, shear, and mixing action on the material as it flows inwardly between said members from the outer surface of said second member to said axial outlet opening within said first member.

2. An extruder for working an extruding plastic material and including a device for controlling back-up pressure and developing a mixing action, comprising a barrel having an inlet and an outlet, an extrusion screw rotatably mounted in said barrel for the movement of plastic material from said inlet through said barrel to said outlet, a first mixing member rigidly connected to said barrel adjacent said outlet and having on the inner face thereof a plurality of concentric annular depressions defined by converging sides, means in said first member defining an axial outlet opening for restricting the discharge flow of material from said extruder, a second mixing member spaced within said barrel on the discharge end of said screw and defining with said barrel an annular space between the outer surface of said second member and said barrel through which such material flows from said screw to said first member, means mounting said second member for rotation with said screw, said second member having a plurality of concentric annular raised portions defined by converging sides and corresponding generally to the configuration of said depressions projecting axially into said depressions in interfitting relationship during rotation of said valve member effecting a controlled back-up pressure and a shearing action on the material as it flows inwardly between said corresponding sides from the outer surface of said second member to said axial outlet opening within said first member.

3. An extruder for working an extruding plastic material and including a discharge control device for controlling back-up pressure and developing a mixing action, comprising a barrel having an inlet and an outlet, an extrusion screw rotatably mounted in said barrel for the movement of plastic material from said inlet through said barrel to said outlet, a first mixing member rigidly connected to said barrel adjacent said outlet and having on the inner face thereof a plurality of concentric annular depressions defined by converging generally straight sides connected by a generally flat root surface, means in said first member defining an axial outlet opening for restricting the discharge flow of material from said extruder, a second mixing member spaced within said barrel on the discharge end of said screw and defining with said barrel an annular space through which such material flows from said screw to said first member, means rotatably mounting said second member with said screw, said second member having a plurality of concentric annular raised portions defined by converging generally straight sides corresponding to the configuration of said depressions and projecting axially into said depression in spaced apart interfitting relationship during rotation of said second member effecting a controlled back-up pressure and a shearing action on the material as it flows inwardly from the periphery of said second member to said axial outlet opening within said first member.

4. An extruder for working and extruding plastic material and including a discharge valve for controlling back-up pressure and developing a mixing action, comprising a barrel having an inlet and an outlet, an axially adjustable extrusion screw rotatably mounted in said barrel for the movement of plastic material from said inlet through said barrel to said outlet, a first valve member rigidly connected to said barrel adjacent said outlet and having on the inner face thereof a plurality of concentric annular depressions defined by converging generally straight sides connected by a root surface of uniform depth from said face, means in said first member defining an axial outlet opening for restricting the discharge flow of material from said extruder, a second valve member spaced within said barrel on the discharge end of said screw to define an annular space between the outer surface of said second valve member and said barrel through which material flows to said first valve member, means for rotatably mounting said second valve member with said screw, said second valve member having a plurality of concentric annular raised portions defined by converging generally straight sides of uniform dimension and corresponding generally to the configuration of said depressions and projecting axially into said depressions in spaced apart interfitting relationship during rotation of said second valve member, and said interfitting raised portions and depressions forming an annular space of alternately decreasing and increasing volume radially of said members providing a head pressure and a shearing action on the material with alternate increasing and decreasing velocity as it flows inwardly between corresponding said straight sides and said root surfaces from adjacent the outer surface of said second valve member to said axial outlet opening within said first valve member.

5. A device for controlling back-up pressure and developing a mixing action on plastic material being extruded from an extruder, comprising a housing having means defining a chamber within which the material is forced under pressure from the extruder, a first mixing member mounted on said housing in generally closing relation to said chamber and having on the inner face thereof a plurality of concentric annular depressions, means in said first member defining an axial outlet opening for restricting the discharge flow of such material, a second mixing member in said chamber in spaced relation to said housing, means for rotating said second member within said housing, said second member having on the face thereof a plurality of concentric annular raised portions corresponding generally to the configuration of said depressions and projecting axially into said depression in spaced interfitting relationship during rotation of said second member to create a simultaneous shear and mixing action on the material as it flows inwardly between said depressions and said raised portions to said axial outlet opening within said first member and means for moving said first and second members axially relative to each other while said second member is rotating.

6. An extruder for working and extruding plastic material and including a device for controlling back-up pressure and developing a mixing action, comprising a barrel having an inlet and an outlet, an extrusion screw rotatably mounted in said barrel for the movement of plastic material from said inlet through said barrel to said outlet, a first mixing member having on the inner face thereof a plurality of concentric annular depressions, means connected to said barrel for supporting said first mixing member, means in said first mixing member defining a centrally located outlet opening for restricting the discharge flow of material from said extruder outlet, a second mixing member, said second member defining with said first mixing member supporting means an annular space through which material flows from said screw to said first member, means rotating said second mixing member relative to said first mixing member, said second mixing member having a plurality of concentric annular raised portions corresponding generally to the configuration of said annular depressions and projecting axially into said depressions in spaced apart interfitting relationship effecting during said relative rotation of said second mixing member a controlled back-up pressure, shear, and mixing action on the material as it flows inwardly between said mixing members from said annular space to said outlet opening within said first mixing member.

References Cited by the Examiner

UNITED STATES PATENTS

| | | | |
|---|---|---|---|
| 540,270 | 6/1895 | Parker | 138—43 |
| 1,114,200 | 10/1914 | Stewart | 138—43 X |
| 1,374,742 | 4/1921 | Jensen et al. | 138—43 |
| 2,593,265 | 4/1952 | Chase et al. | 18—12 |
| 2,944,286 | 6/1960 | Kullgren et al. | 18—12 |
| 3,000,618 | 9/1961 | Oakes. | |
| 3,009,685 | 11/1961 | Rettig | 18—2 |

FOREIGN PATENTS 1,262,650   4/1961   France.

WILLIAM J. STEPHENSON, *Primary Examiner.*